United States Patent
Ong et al.

(10) Patent No.: US 11,438,484 B2
(45) Date of Patent: Sep. 6, 2022

(54) COLOR TEMPERATURE ADJUSTMENT INDEPENDENT OF SCALER COLOR SPACE

(71) Applicant: Dell Products L.P., Round Rock, TX (US)

(72) Inventors: Aik Keong Ong, Singapore (SG); Seen Yee Cindy Cheong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 17/160,097

(22) Filed: Jan. 27, 2021

(65) Prior Publication Data

US 2022/0239804 A1    Jul. 28, 2022

(51) Int. Cl.
*H04N 1/64*    (2006.01)

(52) U.S. Cl.
CPC ..... *H04N 1/644* (2013.01); *H04N 2201/0089* (2013.01)

(58) Field of Classification Search
None
See application file for complete search history.

(56) References Cited

U.S. PATENT DOCUMENTS

| | | | | |
|---|---|---|---|---|
| 2007/0165048 | A1* | 7/2007 | Yamashita | G06T 5/009 348/E9.051 |
| 2019/0028613 | A1* | 1/2019 | Matsimanis | G06T 11/40 |

FOREIGN PATENT DOCUMENTS

JP    2015518295 A  *  6/2015

OTHER PUBLICATIONS

Translation of JP 2015-518295 (Year: 2015).*

* cited by examiner

*Primary Examiner* — Lennin R Rodriguezgonzalez
(74) *Attorney, Agent, or Firm* — Jackson Walker L.L.P.

(57) ABSTRACT

A disclosed scaler resource includes a color management module configured to support two or more color space transformations and two or more color temperature adjustment profiles and to receive first pixel data and perform color processing of the first pixel data to produce second pixel data. The color processing includes a color space transformation in accordance with any of the supported color space transformation matrices and a color temperature adjustment in accordance with any of the supported color temperature adjustment profiles. The color processing is configured wherein a ratio of primary colors produced by performing the color processing on first pixel data corresponding to any primary color is independent of the selected color temperature adjustment profile. The color space transformation may be performed before or after the color temperature adjustment. When performed before, the color transformation matrix is modified to reflect the color temperature adjust profile.

20 Claims, 5 Drawing Sheets

COLOR TEMPERATURE ADJUSTMENT INDEPENDENT OF SCALER COLOR SPACE

TECHNICAL FIELD

The present disclosure relates to electronic display devices and, more specifically, color management features of electronic display devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems frequently include one or more display devices for conveying visually perceptible information such as text, graphics, images, and video to a user. Display devices generally perform at least some type of color management process to achieve chromatically accurate and consistent images across different display devices. Historically, color management has been pre-configured by the manufacturer and the end user has little or no direct control over the color management configuration. In some instances, color management configuration is challenging at least because the color management architecture introduces an undesired relationship or dependency between color space transformation and color temperature adjustment. Nevertheless, professional and high end digital imaging users seek functionality that enables them to control various color management configuration settings and so forth.

SUMMARY

A display device suitable for use in an information handling system includes a display controller resource configured to receive pixel data from a graphics processing resource of a host system. The display device includes color management elements to ensure that colors generated by the host system are accurately reproduced on the display. The color management elements may include a color space transformation block and a color temperature block.

The color management elements of conventional display controllers typically perform color space transformation before color temperature adjustment. Color space transformation can be represented mathematically by a matrix, e.g., a 3×3 matrix in a system that supports an RGB color space while color temperature adjustment is represented mathematically as a gain operation. The conventional configuration of color management elements may result in color inaccuracies if a color temperature adjustment is made after the color transformation process because the color temperature adjustment can alter the composition of the primary color signals.

The present invention supports user customization and configuration of color management elements, including color space and color temperature, without loss of color accuracy, either by performing temperature adjustment before color space transformation or by modifying the color space transformation matrix in accordance with the temperature adjustment to achieve the same result. The latter embodiment may be appropriate in the context of pre-existing scaler hardware, in which color space transformation necessarily occurs before temperature adjustment. In this embodiment, a gain of the color temperature block can be set to 1 and the color space transformation matrix can be modified by applying the temperature adjust gains for each primary to the respective columns of the color space transformation matrix. In a second embodiment, the color management elements may be designed such that color temperature adjustment precedes color space transformation.

The color management elements may further include a gamma block, to linearize gamma-corrected RGB elements before performing color space transformation and color temperature processing, and an inverse-gamma block to restore gamma-correction after performing transformation and color temperature processing.

In accordance with subject matter disclosed herein, a disclosed scaler resource includes a color management module configured to support two or more color space transformations and two or more color temperature adjustment profiles. The scaler resource receives first pixel data and performs color processing of the first pixel data to produce second pixel data. The color processing includes a color space transformation in accordance with any of the supported color space transformation matrices and a color temperature adjustment in accordance with any of the supported color temperature adjustment profiles. The color management module is configured wherein the color temperature adjustment does not alter the composition of the transformed pixel data. For example, a ratio of primary colors produced by performing the color processing on first pixel data corresponding to any primary color is independent of the selected color temperature adjustment profile. The color space transformation may be performed before or after the color temperature adjustment. When performed before, the color transformation matrix is modified to reflect the color temperature adjust profile. This modification may be equivalent to multiplying the color space transformation matrix by a scaling matrix where the scaling matrix is the matrix obtained by multiplying the unity matrix by a color temperature vector corresponding to the color temperature adjustment profile. The color management module may further include a linearization block, to transform gamma corrected pixel data received from a host to linear pixel data prior to the color processing, and a gamma restore block to apply gamma correction to the second pixel data.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
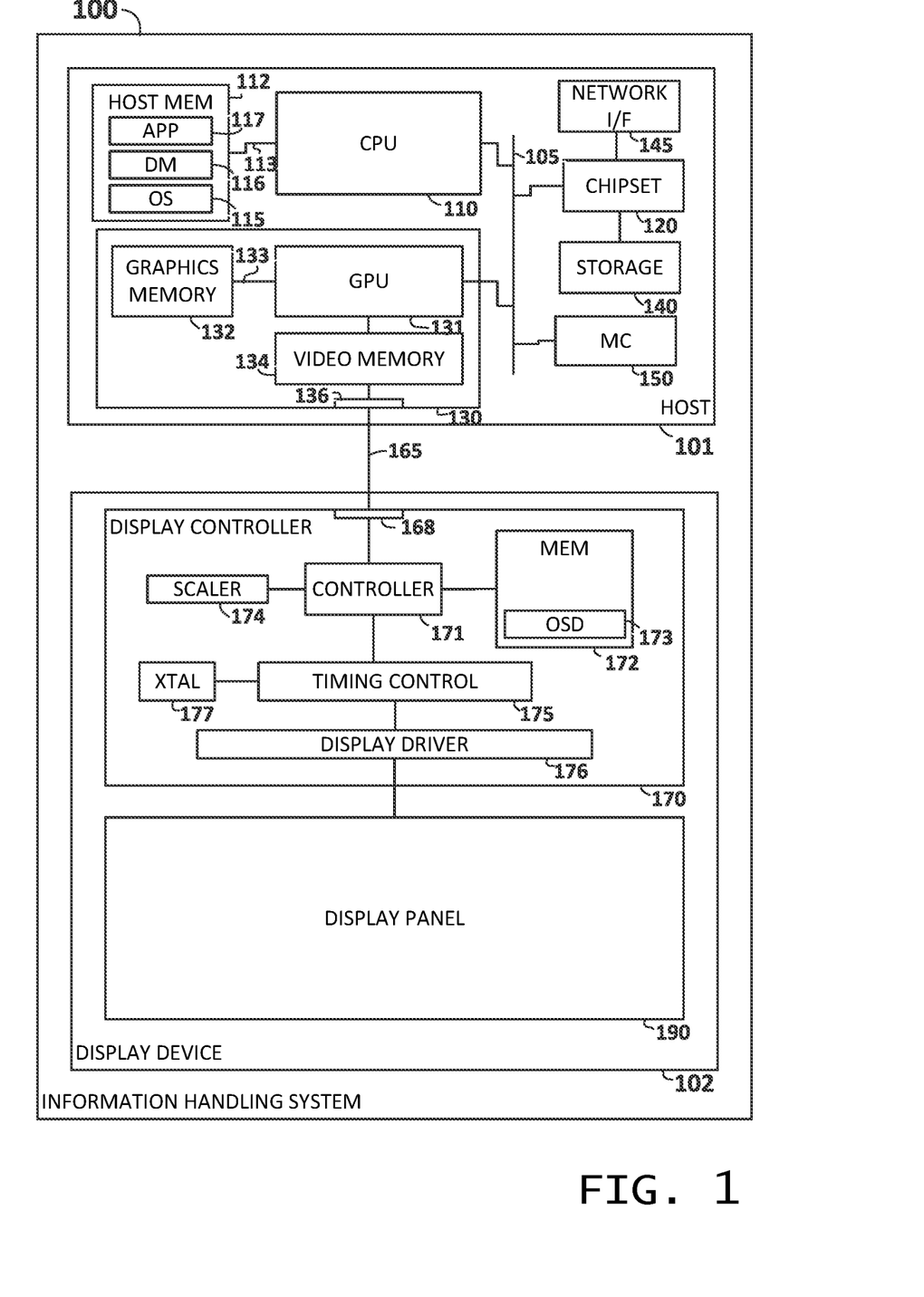
FIG. 1 illustrates a block diagram of an information handling system including a display device.

Referring now to the drawings, FIG. 1 illustrates a block diagram of an information handling system 100 in accordance with color management features disclosed herein. The information handling system 100 illustrated in FIG. 1 includes a host 101 and a display device 102.

It will be readily appreciated by those of ordinary skill in the field of information handling system design and operation that host 101 is configured to boot one or more instances of an operating system (not depicted in FIG. 1) and execute one or more applications programs (not depicted in FIG. 1) that generate display information, including, as non-limiting examples, video content, still image content, graphics content, and alphanumeric text documents including word processing documents, spreadsheet documents, email and text messages documents, presentation documents, and so forth.

Display information may then be processed by a resource such as GPU 131 to obtain pixel data, which may then be encoded into a stream of video content suitable for delivery to a display controller. Pixel data may include pixel-specific color and brightness information for each pixel in a sequence of image frames. Pixel data may be sent to a display controller for additional processing and, ultimately, presentation to the display panel.

The host 101 illustrated in FIG. 1 includes a CPU 110 communicatively coupled to one or more other information handling resources. CPU 110 accesses and executes processor executable instructions stored in a nontransitory computer readable medium. The information handling resources illustrated in FIG. 1 may be implemented as discrete or distinct devices affixed to a mother board (not depicted) or another suitable substrate. In some embodiments, two or more of the information handling resources illustrated in FIG. 1 may be integrated within a single integrated substrate comprising silicon or another electrically suitable material. In some embodiments, features illustrated in FIG. 1 may be implemented with hardware, software, firmware, or a combination thereof. The information handling resources within host 101 may be enclosed within a common chassis or another suitable enclosure.

The information handling resources illustrated in FIG. 1 includes, in addition to CPU 110, a host memory 112, a chipset 120, a graphics resource identified in FIG. 1 as graphics module 130, a persistent storage resource identified in FIG. 1 as storage 140, a network interface 145 and a management resource identified in FIG. 1 as management controller 150.

An interconnect 105 illustrated in FIG. 1 provides communicative coupling between two or more of the illustrated information handling resources. Interconnect 105 may encompass one or more shared buses, one-or-more point to point links, or a combination thereof. Chipset 120 may include or support one or more interconnect switches for coupling interconnect 105 with one or more secondary interconnects for coupling to one or more peripheral resources including, in the illustrated configuration, network interface 145 and storage 140. In at least some embodiments, interconnect 105 includes one or more high speed, serial interconnects exemplified by a peripheral component interconnect express (PCIe) interconnect, preferably supporting a minimum of 16 gigatransactions/second.

The host memory 112 illustrated in FIG. 1 may store processor-executable instructions, sometimes referred to herein as program instructions, which may be accessed and executed by CPU 110. Host memory 112 may include program instructions corresponding to various host system functions, services, and applications. For the sake of simplicity and clarity, however, the program instructions illustrated in FIG. 1 have been limited to operating system instructions (OS) 115, display manager instructions (DM) 116, and an application program 117 that generates display information.

The graphics module 130 illustrated in FIG. 1 includes a GPU 131, communicatively coupled to a graphics memory 132 via graphics memory interconnect 133, and a storage resource identified as video memory 134, which may function as dual-ported frame buffer storage for display device 102. FIG. 1 illustrates video memory 134 communicatively coupled between GPU 131 and a video interface port 136. Video interface port 136 may be configured to encode or otherwise process pixel data received from GPU 131 and video memory 134 and into a stream of video content or multimedia content, which is delivered to a display controller 170 by way of a video transport 165, which may correspond to or include a high definition multimedia interface (HDMI) cable, a DisplayPort cable, a Universal Serial Bus (USB) type C cable, a Thunderbolt cable, or another suitable video interface connection.

In some embodiments, graphics module 130 may be implemented as a video card or video board, in which any one or more of the illustrated elements of graphics module 130 are affixed to a printed circuit board configured to connect to a motherboard (not depicted) of host 101. In other embodiments, some or all of the illustrated elements of graphics module 130 may be embedded in a host system motherboard or integrated within CPU 110, chipset 120, or another one or more of the illustrated information handling resources.

The display controller 170 illustrated in FIG. 1 includes a video interface port 168 communicatively coupled to video interface port 136 of graphics module 130 via video transport 165. Video interface port 168 may be configured to receive and decode and otherwise process a video stream or multimedia stream from graphics module 130 and to provide pixel data to an information handling resource identified in FIG. 1 as controller resource 171.

Controller resource 171 may be implemented in any suitable configuration capable of performing the disclosed controller operations. As non-limiting examples, controller resource 171 may be a programmable integrated circuit, an application specific integrated circuit (ASIC), a field programmable gate array (FPGA), a microcontroller unit (MCU), a CPU or other processing device. In some embodiments, display controller 250 may comprise, or be configured to execute, software and/or firmware to perform one or more of the operations noted herein.

The controller resource 171 illustrated in FIG. 1 is communicatively coupled to a display controller memory 172 and to a scaler resource identified in FIG. 1 as scaler 174. The display controller memory 172 includes on-screen display instructions (OSD) 173, which may be executed by controller resource 171 for presenting one or more on-screen displays to display device 102. On screen displays comprise images that are superimposed on the original video content. On-screen displays may provide one or more display device user interfaces for configuring one or more display settings or characteristics.

The scaler 174 illustrated in FIG. 1 may be implemented in hardware, such as a chip or semiconductor integrated circuit, in software, such as a set of executable programs instructions (not explicitly depicted in FIG. 1) stored in display controller memory 172 and executed by controller resource 171, or a combination of both hardware and software. Scaler 174 may perform or facilitate any of one or more video support functions. As an example, GPU 131 may generate pixel data with a transport format that differs from the pixel resolution of display device 102. In such instances, scaler 174 may be configured to convert the pixel data from one format to another. In addition, scaler 174 may be configured to perform gamma correction, color space transformation, and so forth. Scaler 174, as described in detail below, may further include or support color management features enabling color temperature adjustment that does not undesirably or unintentionally impact the accuracy of the displayed images.

Controller resource 171, in conjunction with scaler 174 and OSD 173, may process incoming pixel data from host 101 and provide the processed pixel data to timing control logic 175. The timing control logic 175 illustrated in FIG. 1 receives the processed pixel data from controller resource 171 and one or more clock signals from a clock source represented in FIG. 1 by crystal oscillator 177. Timing control logic 175 is configured to generate time-synchronized display driver input signals that cause display driver circuitry 176 to generate and deliver time-synchronized driving signals, such as low voltage differential signals (LVDS), to the display panel and thereby cause the display panel to display the display content as a sequence of image frames.

The color management features of the display device 102 illustrated in FIG. 1 are described herein in the context of an RGB color model and, more specifically, an 8-bit RGB color model in which each pixel's color is indicated as a weighted combination of red, green, and blue primaries where the luminous intensity of each primary can vary from 0, corresponding to no brightness or minimal brightness, to 255 maximum brightness. Although this disclosure relies on illustrations and descriptions of RGB color model examples, obvious extensions and variations of the disclosed examples would be readily apparent to one of ordinary skill in the field of digital imaging.

Figure 2:
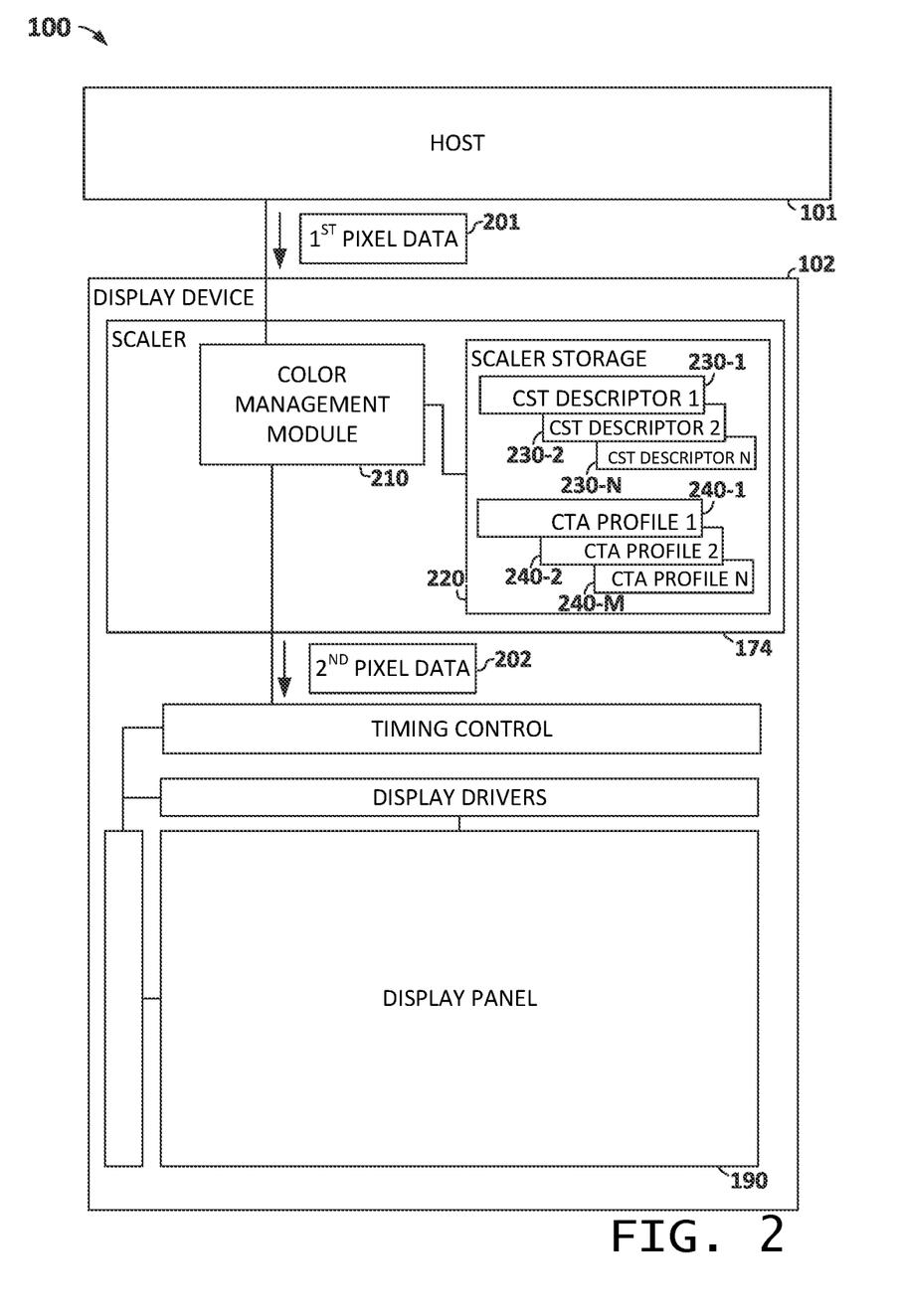
FIG. 2 illustrates color management features of the display device of FIG. 1.

Referring now to FIG. 2, a block diagram of information handling system 100 includes additional detail of color management resources in display device 102. As illustrated in FIG. 2, host 101 sends first pixel data 201 to a scaler 174 in display device 102 and, more specifically, to a color management module 210 of scaler 174. Color management module 210 may be configured to perform one or more color management operations to modify, convert, or otherwise change first pixel data 201 into second pixel data 202, which is then forwarded to display panel 190 via timing control and display driver resources described in FIG. 1.

In at least one embodiment, scaler 174 supports two or more color spaces and enables end users to apply any of one or more preconfigured or user-defined color temperature adjustments. As depicted in FIG. 2, each supported color space corresponds to a color space transformation Descriptor 230 stored in scaler storage 220 and each available color temperature adjustment corresponds to a color temperature adjustment profile 240. Significantly, as described in more detail below, each of the preconfigured and user-defined color temperature adjustment profiles 240 may be used without diminishing or otherwise altering the accuracy of the selected color space.

Each color space transformation descriptor 230 may enable a corresponding color space standard by specifying a color space transformation matrix suitable for transforming first pixel data 201 into second pixel data 202 formatted in accordance with applicable color space standard. Exemplary color spaces that may be represented by a color space transformation descriptor 230 in FIG. 1 include, as non-limiting examples, an sRGB color space, an Adobe RGB color space, and so forth. Each color temperature adjustment profile 240 may consist of or include a gain value for each primary color of the selected color space. For an embodiment employing an RGB color model, each color space transformation descriptor 230 may consist of or include a 3×3 matrix and each color temperature adjustment profile 240 may consist of or include a 3 dimension vector.

Figure 3:
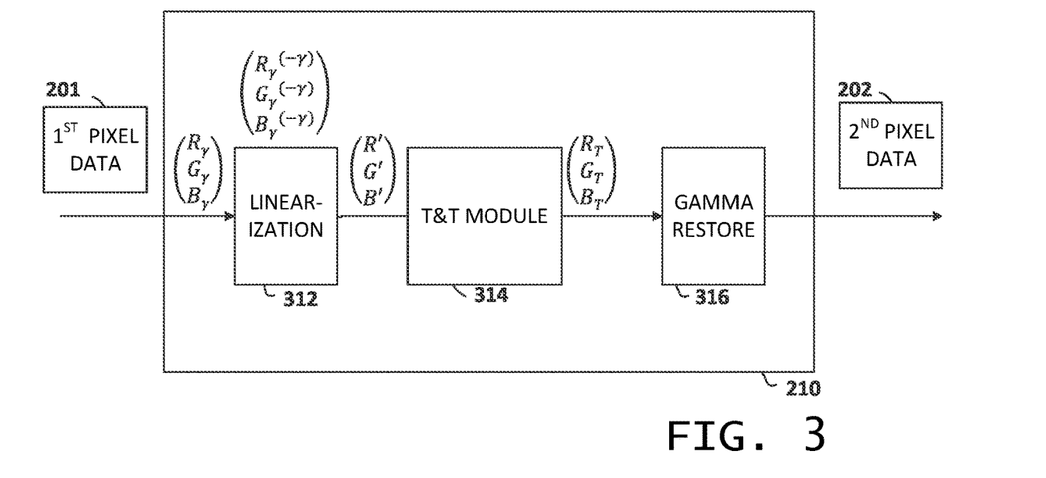
FIG. 3 illustrates a block diagram of color management modules of the display device.

Referring now to FIG. 3, a block diagram illustrates color management elements of an exemplary color management module 210. As depicted in FIG. 3, color management module 210 includes a series of functional blocks, each of which may be implemented in hardware, software, or a combination of both. The functional blocks of the illustrated color management module 210 include a linearization block 312, a translation and temperature (T&T) module 314, and a gamma restoration block 316. Although FIG. 3 illustrates three distinct components implementing the illustrated functional blocks, the functions performed by each block may be implemented in a single hardware device or software resource.

First pixel data 201 received from host 101 may include gamma-corrected RGB values, calculated by the host in accordance with a gamma value of 2.2, 2.6, or some other suitable or standardized value of gamma. In such embodiments, first pixel data 201 may be represented as a 3-dimensional vector such as $$\begin{pmatrix} R_\gamma \\ G_\gamma \\ B_\gamma \end{pmatrix},$$

where the gamma subscript conveys that the applicable value is a gamma-corrected value. In at least one embodiment, linearization block 312 effectively removes gamma correction from the gamma adjusted vector $$\begin{pmatrix} R_\gamma \\ G_\gamma \\ B_\gamma \end{pmatrix},$$

received from host 101. The removal of gamma correction is represented in FIG. 3 as an exponential function in which the exponent is $1/\gamma$ and the output of linearization block 312 is represented as $$\begin{pmatrix} R' \\ G' \\ B' \end{pmatrix}.$$

Thus:

$$R'=R_\gamma^{(1/\gamma)},\ G'=G_\gamma^{(1/\gamma)},\ \text{and}\ B'=B_\gamma^{(1/\gamma)}$$

Extracting gamma correction in linearization block 312 beneficially facilitates and simplifies the subsequent operations, including the operations performed within T&T module 314. FIG. 3 conveys that T&T module 314 produces transformed RGB values, notated as $$\begin{pmatrix} R_T \\ G_T \\ B_T \end{pmatrix},$$

which are then processed in gamma restoration block 316 to obtain second pixel data 202.

Figure 4:
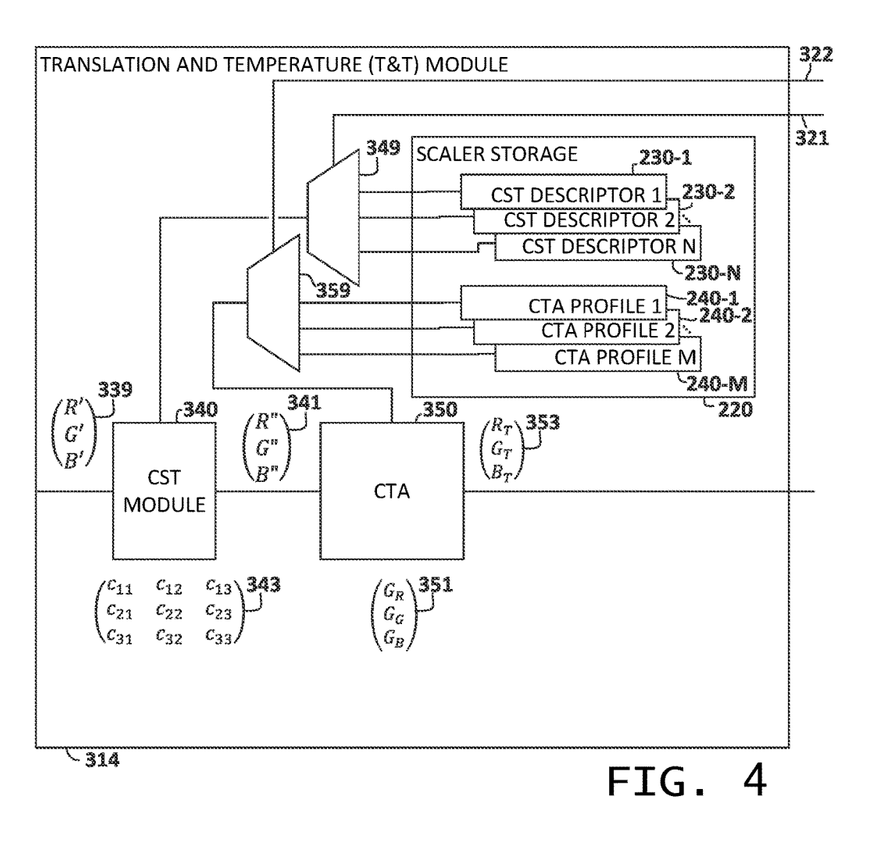
FIG. 4 illustrates a first embodiment of translation and temperature module.
Figure 5:
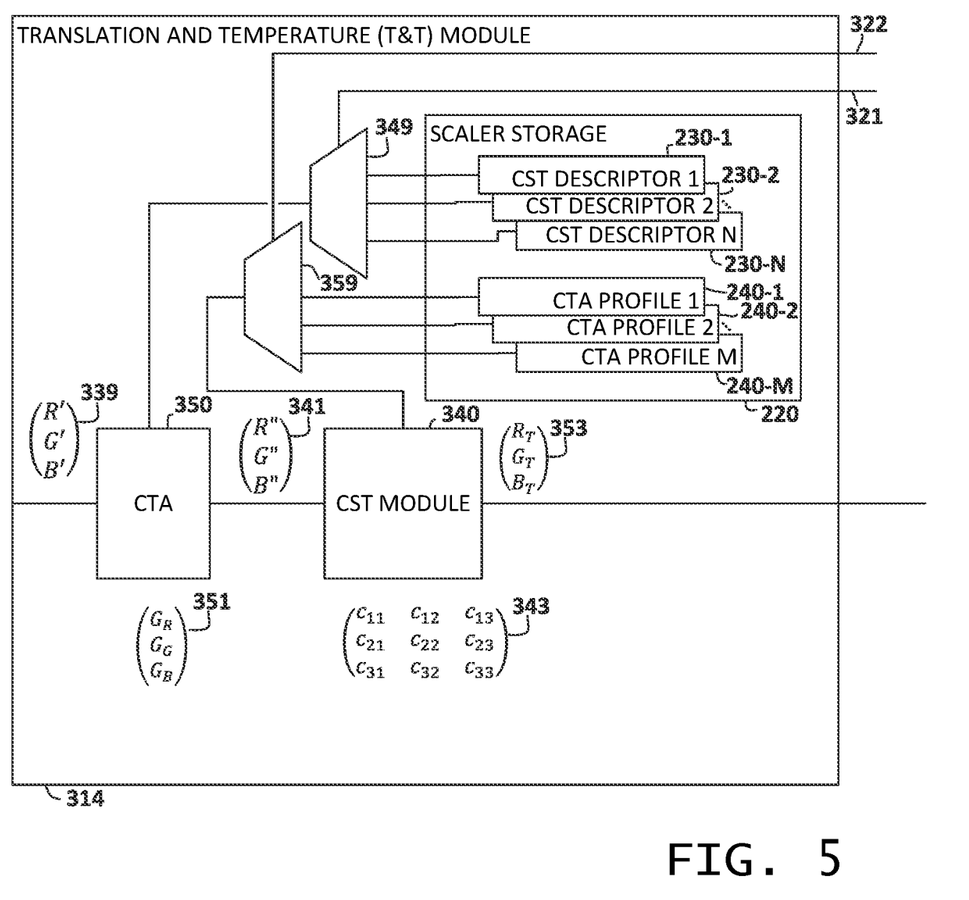
FIG. 5 illustrates a second embodiment of a translation and temperature module in which temperature adjust precedes color space transformation.
Figure 6:
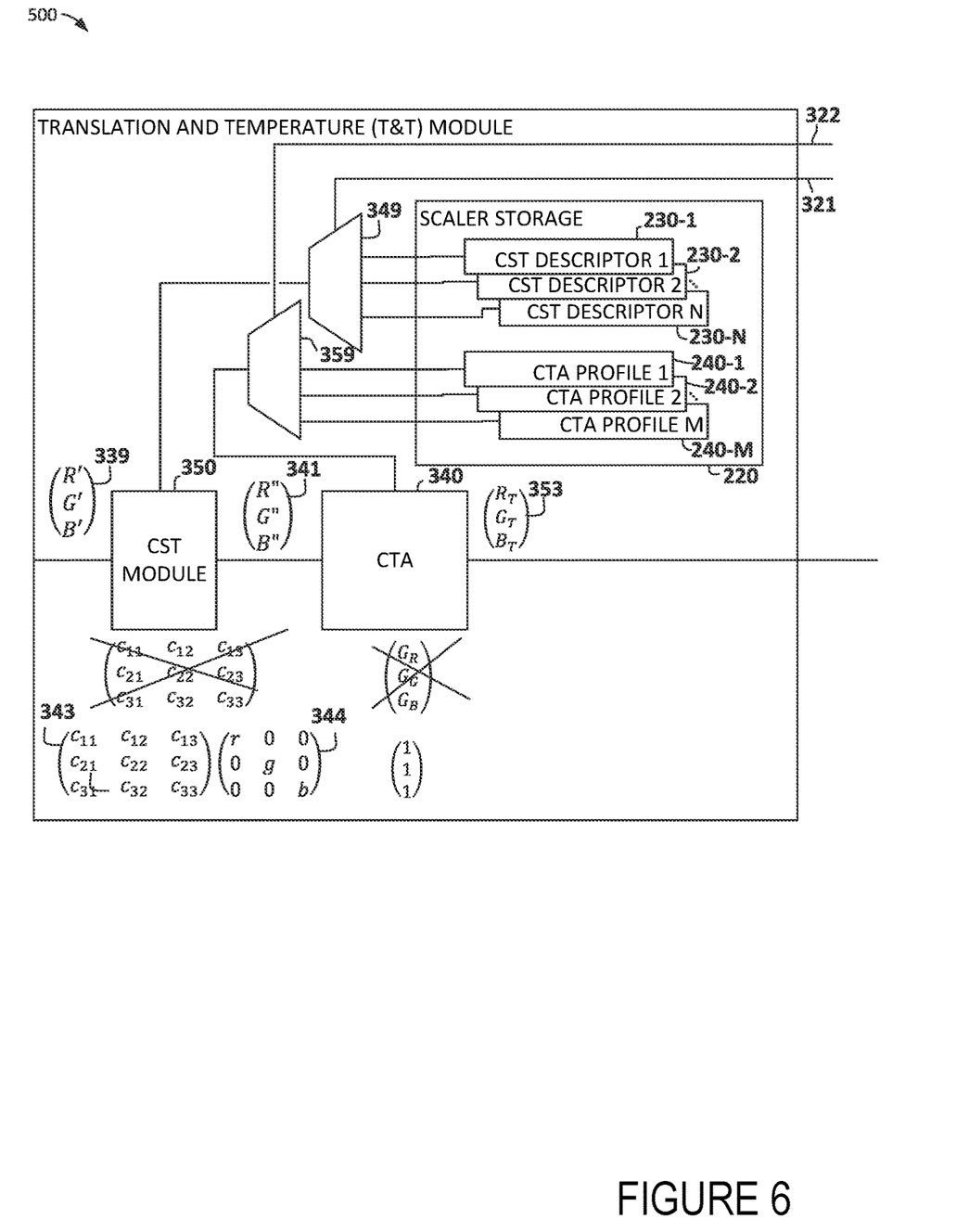
FIG. 6 illustrates a third embodiment of the translation and temperature module in which color space transformation precedes color temperature adjustment, but the translation matrix is scaled in accordance with the color temperature adjustment profile.

Referring now to FIG. 4, FIG. 5, and FIG. 6, three embodiments of T&T module 314 are illustrated. Each of the three illustrated embodiments includes a plurality of color space transformation descriptors 230 corresponding to a plurality of supported color spaces and a plurality of color temperature adjustment profiles 240 corresponding to a plurality of supported color temperatures. Each of the T&T modules 314 illustrated in FIGS. 4, 5, and 6 further includes a color space transformation module 340, a color space transformation multiplexer 349, a color temperature adjustment block 350, and a color temperature adjustment multiplexer 359.

Referring specifically to FIG. 4, the illustrated color space transformation module 340 transforms input vector $$\begin{bmatrix} R' \\ G' \\ B' \end{bmatrix}$$

339 into output vector $$\begin{bmatrix} R'' \\ G'' \\ B'' \end{bmatrix}$$

341 in accordance with one of the color space transformation descriptors 230 corresponding to the desired or selected color space. Each color space transformation descriptor 230 may represent a matrix, such as the 3×3 color space transformation descriptor 343 illustrated in FIG. 4, and color space transformation module 340 may be configured to perform matrix multiplication. In these embodiments, the $$\begin{bmatrix} R'' \\ G'' \\ B'' \end{bmatrix}$$

output vector 341 is equal to $$\begin{bmatrix} c_{11} & c_{12} & c_{13} \\ c_{21} & c_{22} & c_{23} \\ c_{31} & c_{32} & c_{33} \end{bmatrix} \cdot \begin{bmatrix} R' \\ G' \\ B' \end{bmatrix} \text{ or}$$

$$\begin{pmatrix} R'c_{11} + G'c_{12} + B'c_{13} \\ R'c_{21} + G'c_{22} + B'c_{23} \\ R'c_{31} + G'c_{32} + B'c_{33} \end{pmatrix}$$

The color temperature adjustment block 350 shown in FIG. 4 may be configured to perform vector multiplication between the output vector $$\begin{pmatrix} R'' \\ G'' \\ B'' \end{pmatrix}$$

341 and the color temperature adjustment profile vector $$\begin{pmatrix} G_R \\ G_G \\ G_B \end{pmatrix}$$

351 to generate the transformed vector $$\begin{pmatrix} R_T \\ G_T \\ B_T \end{pmatrix}$$

353. In this embodiment, $$\begin{pmatrix} R_T \\ G_T \\ B_T \end{pmatrix} = \begin{pmatrix} G_R \cdot R'' \\ G_G \cdot G'' \\ G_B \cdot B'' \end{pmatrix}$$

To evaluate the impact of performing color temperature adjustment after color space transformation, the primary signals may be evaluated individually. For the red primary, $R'=1$ and $G'=B'=0$ Therefore, $R''=c_{11}; G''=c_{21};$ and $B''=C_{31}$ For a native color temperature, the red, green, and blue gains are 1, which results in the following transformed values for the red primary.

$R_T=c_{11}; G_T=c_{21};$ and $B_T=c_{31}$

If however, the color temperature is adjusted with a color temperature profile having red, blue, and green gains equal to r, g, and b respectively, then the transformed values of red, blue, and green are as follows:

$R_T=r\cdot c_{11}$ and $G_T=g\cdot C_{21}$ and $B_T=b\cdot c_{31}$

The R/G/B ratio with native color temperature is $c_{11}/c_{21}/c_{31}$ whereas the R/G/B ratio when the color temperature is adjusted to a color temperature that is non-native is $rc_{11}/gc_{21}/bc_{31}$ Assuming r, g, and b include at least two values that are not equal, the transformation of the red primary varies depending on the color temperature adjustment profile, which is a generally undesirable result. FIG. 5 and FIG. 6 illustrate two variations on FIG. 4 that address the dependency between color space and color temperature adjustment.

Referring to FIG. 5, the T&T module 314 of FIG. 4 is modified to decouple color temperature adjustment from color transformation. In FIG. 5, the color temperature adjustment block 350 is moved in front of color space transformation module 340. In this configuration, when the red primary is temperature adjusted by color temperature adjustment block 350, the green and blue components, G" and B", in output vector 341 are both 0 and the R/G/B ratio of the transformed vector 353 has values $rc_{11}/rc_{21}/rc_{31}$ and the R/G/B ratio is the same as the R/G/B ratio with native temperature adjustment, i.e., the composition of the color-space-transformed primary colors will not affected by different color temperature adjustments. While the embodiment depicted in FIG. 5 is functional, many existing scaler resources have been implemented and installed with the color space transformation module configured to execute before color temperature is adjusted, rendering the solution illustrated in FIG. 5 impracticable for many applications.

To achieve independence between color transformation and color temperature within a scaler design that performs color transformation before performing color temperature adjustment, FIG. 6 illustrates an embodiment in which the color space transformation descriptor is scaled or adjusted based on the color temperature adjustment and the gain in the color temperature adjustment module is then set to unity.

More specifically, the color space transformation descriptor 343 is scaled in accordance with the color temperature adjust profile by multiplying the original color space transformation descriptor 343 by a scaling matrix 344 of the form $$\begin{pmatrix} r & 0 & 0 \\ 0 & g & 0 \\ 0 & 0 & b \end{pmatrix}$$

where r, g, and b are the gain values for the color temperature adjustment profile. Multiplying the original color space transformation matrix by the scaling matrix results in a scaled color space transformation matrix of the form $$\begin{pmatrix} r\cdot c_{11} & g\cdot c_{12} & b\cdot c_{13} \\ r\cdot c_{21} & g\cdot c_{22} & b\cdot c_{23} \\ r\cdot c_{31} & g\cdot c_{32} & b\cdot c_{33} \end{pmatrix}$$

Because the color temperature adjustment profile has been effectively incorporated into the color space transformation module, the gain profile of the color temperature adjustment module is set to unity $$\begin{pmatrix} 1 \\ 1 \\ 1 \end{pmatrix}.$$

The net result is a function that is equivalent to the T&T module of FIG. 5. In either case, the embodiments depicted in FIG. 5 and FIG. 6 both achieve the ability to combine any supported color space model and color temperature profiles without altering the characteristics of the selected color space.

Although the present disclosure has been described in detail, it should be understood that various changes, substitutions, and alterations can be made hereto without departing from the spirit and the scope of the disclosure as defined by the appended claims.

What is claimed is:

1. A scaler resource, wherein the scaler resource includes a color management module configured to:
   support two or more color space transformations and two or more color temperature adjustment profiles;
   receive first pixel data; and
   perform color processing of the first pixel data to produce second pixel data, wherein the color processing includes:
      a color space transformation in accordance with any color space transformation matrix selected from the one of the two or more color space transformation matrices; and a color temperature adjustment in accordance with any color temperature adjustment profile selected from the of two or more color temperature adjustment profiles;
wherein a ratio of primary colors produced by performing the color processing on first pixel data corresponding to a primary color is independent of the selected color temperature adjustment profile.

2. The scaler resource of claim 1, wherein performing the color processing comprises performing the color space transformation after performing the color temperature adjustment.

3. The scaler resource of claim 1, wherein performing the color processing includes performing the color space transformation before performing the color temperature adjustment.

4. The scaler resource of claim 3, wherein the performing the color space transformation before the color temperature adjustment incudes modifying the color space transformation matrix based on the color temperature adjustment profile and modifying the color temperature adjust profile to reflect a gain of unit for all primary colors.

5. The scaler resource of claim 4, wherein modifying the color space transformation matrix comprises multiplying the color space transformation matrix by a scaling matrix, wherein the scaling matrix is equivalent to multiplying a unity matrix by a vector corresponding to the color temperature adjustment profile.

6. The scaler resource of claim 1, wherein the color management module further includes a linearization block to transform gamma corrected pixel data received from a host to linear pixel data prior to the color processing.

7. The scaler resource of claim 6, wherein the color management module further includes a gamma restore block to apply gamma correction to the second pixel data.

8. A display device, comprising:
a display panel;
timing control logic to drive the display panel in accordance with pixel data; and
a scaler resource configured to provide pixel data to the timing control logic, wherein the scaler resource includes a color management module configured to:
support two or more color space transformations and two or more color temperature adjustment profiles;
receive first pixel data; and
perform color processing of the first pixel data to produce second pixel data, wherein the color processing includes:
a color space transformation in accordance with any color space transformation matrix selected from the one of the two or more color space transformation matrices; and
a color temperature adjustment in accordance with any color temperature adjustment profile selected from the of two or more color temperature adjustment profiles;
wherein a ratio of primary colors produced by performing the color processing on first pixel data corresponding to a primary color is independent of the selected color temperature adjustment profile.

9. The display device of claim 8, wherein performing the color processing comprises performing the color space transformation after performing the color temperature adjustment.

10. The display device of claim 8, wherein performing the color processing includes performing the color space transformation before performing the color temperature adjustment.

11. The display device of claim 10, wherein the performing the color space transformation before the color temperature adjustment incudes modifying the color space transformation matrix based on the color temperature adjustment profile and modifying the color temperature adjust profile to reflect a gain of unit for all primary colors.

12. The display device of claim 11, wherein modifying the color space transformation matrix comprises multiplying the color space transformation matrix by a scaling matrix, wherein the scaling matrix is equivalent to multiplying a unity matrix by a vector corresponding to the color temperature adjustment profile.

13. The display device of claim 8, wherein the color management module further includes a linearization block to transform gamma corrected pixel data received from a host to linear pixel data prior to the color processing.

14. The display device of claim 13, wherein the color management module further includes a gamma restore block to apply gamma correction to the second pixel data.

15. An information handling system, comprising:
a central processing unit (CPU);
a graphics module configured to generate pixel data in accordance with video information received from the CPU; and
a display device configured to display images in accordance with the pixel data, wherein the display device includes a scaler resource, wherein the scaler resource includes a color management module configured to:
support two or more color space transformations and two or more color temperature adjustment profiles;
receive first pixel data; and
perform color processing of the first pixel data to produce second pixel data, wherein the color processing includes:
a color space transformation in accordance with any color space transformation matrix selected from the one of the two or more color space transformation matrices; and
a color temperature adjustment in accordance with any color temperature adjustment profile selected from the of two or more color temperature adjustment profiles;
wherein a ratio of primary colors produced by performing the color processing on first pixel data corresponding to a primary color is independent of the selected color temperature adjustment profile.

16. The scaler resource of claim 15, wherein performing the color processing comprises performing the color space transformation after performing the color temperature adjustment.

17. The scaler resource of claim 15, wherein performing the color processing includes performing the color space transformation before performing the color temperature adjustment.

18. The scaler resource of claim 17, wherein the performing the color space transformation before the color temperature adjustment incudes modifying the color space transformation matrix based on the color temperature adjustment profile and modifying the color temperature adjust profile to reflect a gain of unit for all primary colors.

19. The scaler resource of claim 18, wherein modifying the color space transformation matrix comprises multiplying the color space transformation matrix by a scaling matrix, wherein the scaling matrix is equivalent to multiplying a unity matrix by a vector corresponding to the color temperature adjustment profile.

20. The scaler resource of claim 15, wherein the color management module further includes:
- a linearization block to transform gamma corrected pixel data received from a host to linear pixel data prior to the color processing; and
- a gamma restore block to apply gamma correction to the second pixel data.

* * * * *